(12) United States Patent
Eberl et al.

(10) Patent No.: US 12,326,422 B2
(45) Date of Patent: Jun. 10, 2025

(54) GAS SENSOR CONTAINING AN ULTRASONIC RESONATOR AND USE FOR THE DETECTION OF GASES

(71) Applicant: Infineon Technologies AG, Neubiberg (DE)

(72) Inventors: Matthias Eberl, Taufkirchen (DE); Christian Bretthauer, Munich (DE)

(73) Assignee: Infineon Technologies AG, Neubiberg (DE)

( * ) Notice: Subject to any disclaimer, the term of this patent is extended or adjusted under 35 U.S.C. 154(b) by 394 days.

(21) Appl. No.: 17/823,335

(22) Filed: Aug. 30, 2022

(65) Prior Publication Data

US 2023/0114068 A1 Apr. 13, 2023

(30) Foreign Application Priority Data

Oct. 13, 2021 (DE) .......................... 102021126505.3

(51) Int. Cl.
*G01N 29/036* (2006.01)
*G01N 29/32* (2006.01)

(52) U.S. Cl.
CPC ......... *G01N 29/036* (2013.01); *G01N 29/326* (2013.01)

(58) Field of Classification Search
None
See application file for complete search history.

(56) References Cited

U.S. PATENT DOCUMENTS

| | | | |
|---|---|---|---|
| 2010/0275675 A1* | 11/2010 | Seppa | G01N 29/036 73/488 |
| 2019/0086351 A1* | 3/2019 | Yamashita | G01N 33/005 |
| 2019/0346392 A1* | 11/2019 | Tsuboyama | H01M 8/04074 |
| 2023/0059356 A1* | 2/2023 | Meinhold | G01M 3/20 |

FOREIGN PATENT DOCUMENTS

| | | | |
|---|---|---|---|
| DE | 102014109908 A1 | 1/2015 | |
| DE | 102017213520 A1 | 2/2019 | |
| DE | 102017214786 A1 | 2/2019 | |
| DE | 102017223869 A1 | 7/2019 | |
| DE | 102018210387 A1 | 1/2020 | |
| WO | WO-2021028827 A1 * | 2/2021 | G01H 11/00 |

OTHER PUBLICATIONS

Kim et al., "Electrostatic gas sensor with a porous silicon diaphragm," Sensors and Actuators B: Chemical, vol. 219, 2015, pp. 10-16, ISSN 0925-4005, https://doi.org/10.1016/j.snb.2015.04.118.

* cited by examiner

*Primary Examiner* — Peter J Macchiarolo
*Assistant Examiner* — Jermaine L Jenkins
(74) *Attorney, Agent, or Firm* — Harrity & Harrity, LLP

(57) ABSTRACT

A gas sensor comprises a membrane, a first plate arranged on a first side of the membrane and having through openings for the passage of a gas, a second plate arranged on a second side of the membrane, the second side being situated opposite the first side, and an electronic circuit, which is connected to the membrane, the first plate and the second plate and causes the membrane to emit ultrasonic radiation, and which is configured to determine a resonant frequency of the ultrasonic radiation.

24 Claims, 3 Drawing Sheets

GAS SENSOR CONTAINING AN ULTRASONIC RESONATOR AND USE FOR THE DETECTION OF GASES

CROSS REFERENCE TO RELATED APPLICATION

This application claims priority to German Patent Application No. 102021126505.3 filed on Oct. 13, 2021, the content of which is incorporated by reference herein in its entirety.

TECHNICAL FIELD

The present disclosure relates to a gas sensor, and to the use of same for detecting gases, in particular hydrogen.

BACKGROUND

The fuel cell is becoming increasingly important in the field of electromobility. The operation of fuel cells relies primarily on hydrogen. A fuel cell system operated with hydrogen gas ($H_2$) has one or more hydrogen stores in addition to a fuel cell. Such hydrogen stores, for example when used in a motor vehicle, can be configured as cylinders in which the hydrogen is stored under an elevated pressure of approximately 700 bar. If a plurality of such hydrogen stores are arranged in the motor vehicle, a range of the motor vehicle can be configured accordingly.

For the operation of a fuel cell system in a motor vehicle, the safety aspect is of particular importance. Since gaseous hydrogen reacts exothermically with oxygen from the air in a wide ignition range even with low ignition energy (oxyhydrogen reaction), it is extremely important to detect, safely and reliably, the presence of hydrogen outside the hydrogen stores and the fuel cell, supply lines and discharge lines.

These and other reasons motivate a need for the present disclosure.

SUMMARY

A first aspect of the present disclosure relates to a gas sensor, comprising a membrane, a first plate arranged on a first side of the membrane and having through openings for the passage of a gas, a second plate arranged on a second side of the membrane, the second side being situated opposite the first side, and an electronic circuit, which is connected to the membrane, the first plate and the second plate and causes the membrane to emit ultrasonic radiation, and which is configured to determine a resonant frequency of the ultrasonic radiation.

A second aspect of the present disclosure relates to a use of a gas sensor according to the first aspect for detecting a gas, in particular hydrogen.

BRIEF DESCRIPTION OF THE DRAWINGS

A gas sensor in accordance with the disclosure is explained in greater detail below with reference to drawings. The elements shown in the drawings are not necessarily rendered in a manner true to scale relative to one another. Identical reference signs can designate identical components. Identical reference numerals designate corresponding identical or similar parts.

DETAILED DESCRIPTION

In the following detailed description, reference is made to the accompanying drawings, which form part of this description and show for illustration purposes specific implementations in which the disclosure can be practiced. In this case, direction-indicating terminology such as "at the top", "at the bottom", "at the front", "at the back", "leading", "trailing", etc. is used with respect to the orientation of the figure(s) described. Since the constituents of implementations can be positioned in different orientations, the direction designation is used for illustration and is not restrictive in any way. It goes without saying that other implementations can also be used, and structural or logical changes can be made, without the scope of the present disclosure being exceeded. Therefore, the following detailed description should not be understood to be restrictive, and the scope of the present disclosure is defined by the appended claims.

It goes without saying that the features of the various example implementations described here can be combined with one another, unless expressly indicated otherwise.

As used in this specification, the terms "adhesively bonded", "secured", "connected", "coupled" and/or "electrically connected/electrically coupled" do not mean that the elements or layers must be directly contacted with one another; intermediate elements or layers can be provided between the "adhesively bonded", "secured", "connected", "coupled" and/or "electrically connected/electrically coupled" elements. In accordance with the disclosure, however, the terms mentioned above may optionally also have the specific meaning that the elements or layers are directly contacted with one another, that is to say that no intermediate elements or layers are provided between the "adhesively bonded", "secured", "connected", "coupled" and/or "electrically connected/electrically coupled" elements.

Furthermore, the word "over" used with regard to a part, an element or a material layer that is formed or arranged "over" a surface may mean herein that the part, the element or the material layer is arranged (e.g. positioned, formed, deposited, etc.) "indirectly" on the implied surface, wherein one or more additional parts, elements or layers are arranged between the implied surface and the part, the element or the material layer. However, the word "over" used with regard to a part, an element or a material layer that is formed or arranged "over" a surface may optionally also have the specific meaning that the part, the element or the material layer is arranged (e.g. positioned, shaped, deposited, etc.) "directly on", e.g. in direct contact with, the implied surface.

Figure 1:
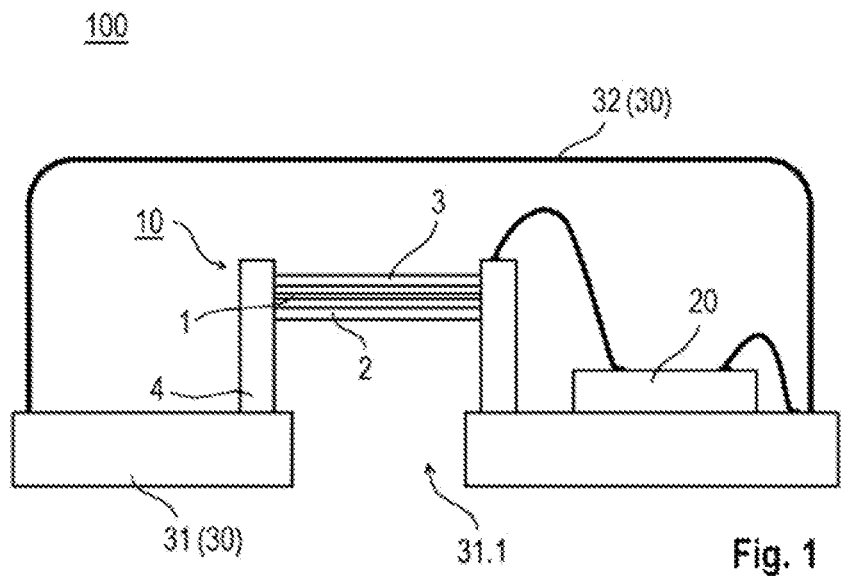
FIG. 1 shows a schematic lateral cross-sectional view of one example implementation of a gas sensor in accordance with the first aspect, in which a sensor element and a chip having an electronic circuit are accommodated within a common housing.

FIG. 1 shows a schematic lateral cross-sectional view of one example implementation of a gas sensor in accordance with the first aspect, in which a sensor element and a semiconductor chip having an electronic circuit are accommodated within a common housing.

The gas sensor 100 in accordance with FIG. 1 has a sensor element 10 and a semiconductor chip 20, which are accommodated in a common housing 30. The housing 30 has a substrate 31 and a housing cover 32, wherein the sensor element 10 and the semiconductor chip 20 are applied on the substrate 31. The substrate 31 has an inlet opening 31.1 for the passage of a gas to be detected. The sensor element 10 is arranged above the opening.

The sensor element 10 contains a membrane 1, a first plate 2 arranged on a first side of the membrane 1 and having through openings for the passage of a gas, and furthermore a second plate 3 arranged on a second side of the membrane 1, the second side being situated opposite the first side. The first plate 2 faces the inlet opening 31.1 of the substrate 31, while the second plate 3 faces away from the inlet opening 31.1 of the substrate 31 and faces the horizontal section of the housing cover.

The sensor element 10 is constructed as a MEMS component. In some implementations, the membrane 1, the first plate 2 and the second plate 3 are produced based on Si and are secured between side walls 4, which are likewise produced based on Si.

The semiconductor chip 20 is connected to the sensor element 10 by one or more bond wires and serves both for controlling the sensor element 10 and for evaluating the signals supplied by the sensor element 10. The semiconductor chip 10 essentially contains an electronic circuit, which is connected to the membrane 1, the first plate 2 and the second plate 3 and causes the membrane 1 to emit ultrasonic radiation. The emitted ultrasonic radiation is partly reflected and partly transmitted at the first plate 2 and the second plate 3. This gives rise to the three resonators indicated by arrows, wherein the two upper resonators are closed resonators, each formed between two opposing reflective walls. The lower resonator between the membrane 1 and the inlet opening 31.1 of the substrate 31 forms a Helmholtz resonator open at one end.

The resonator system formed in this way has one or more distinct resonant frequencies. The electronic circuit contained in the semiconductor chip 20 is configured to determine a resonant frequency of the ultrasonic radiation. Hydrogen has a speed of sound 8 times higher than air. With the presence of hydrogen in the gas sensor, the resonant frequency thus shifts as well, the intensity of the shift being a measure of the hydrogen concentration.

As described below, there are a number of possibilities for using this system to determine the shift in the resonant frequency on account of a change in the $H_2$ concentration.

Figure 2:
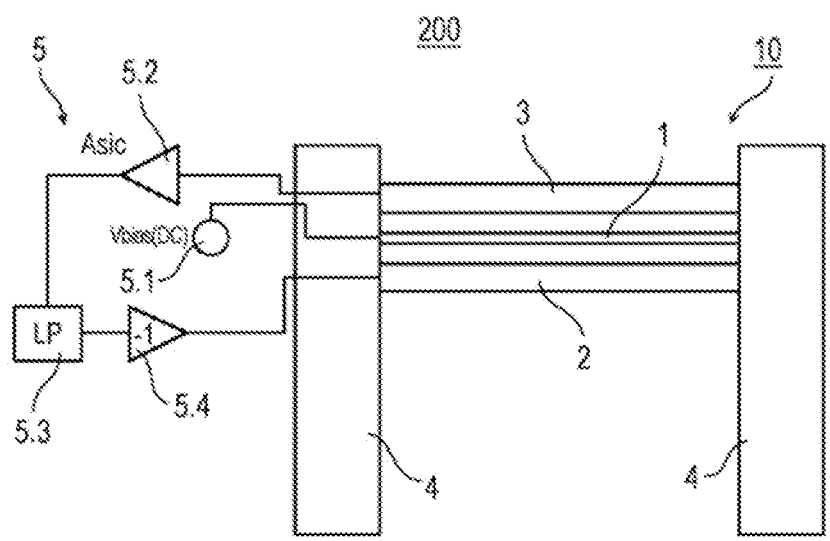
FIG. 2 shows a schematic lateral cross-sectional view of one example implementation of a gas sensor, in which an output signal of the sensor element is phase-shifted by 180° in the electronic circuit and the phase-shifted signal is fed to the first plate again.

FIG. 2 shows a schematic lateral cross-sectional view of one example implementation of a gas sensor, in which an output signal of the sensor element is phase-shifted by 180° in the electronic circuit and the phase-shifted signal is fed to the first plate again.

The gas sensor 200 in accordance with FIG. 2 has, in principle, the same construction as the gas sensor 100 in FIG. 1, and so the same reference signs have been used. The gas sensor 200 can likewise have a semiconductor chip (not shown) having an electronic circuit 5. The electronic circuit 5 forms a resonator with a closed control loop, in which the output signal is extracted from the sensor element 10, rotated by 180°, amplified and fed back into the microphone input. This generates a normally off system that always oscillates at the resonance peak.

Figure 3:
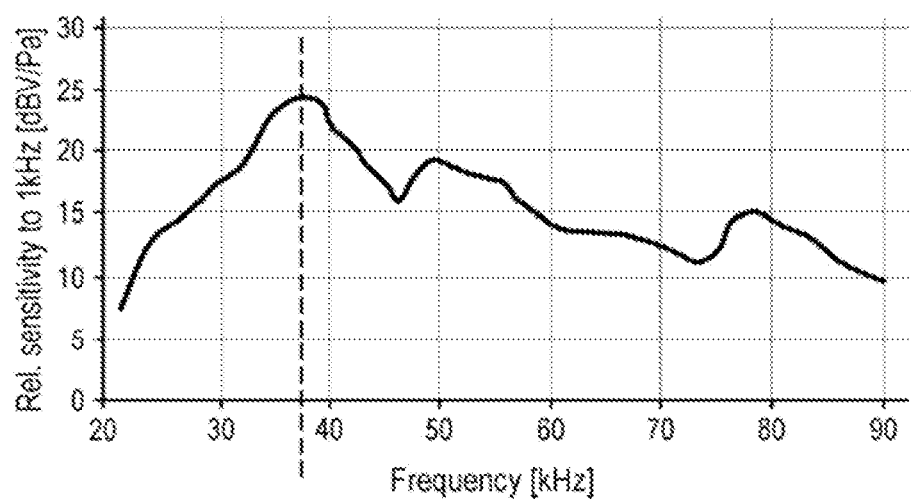
FIG. 3 shows one example resonance curve of a gas sensor in accordance with the first aspect.

FIG. 3 shows one example resonance curve of a gas sensor. The resonance peak, depicted by a dashed line, is at approximately 37.2 kHz. The closed control loop of the electronic circuit 5 will settle in terms of oscillation at this resonance peak.

In specific detail, the electronic circuit 5 has a voltage supply 5.1, which is connected to the membrane 1 and using which a voltage in the range of 5 to 10 V is applied to the membrane 1. The output signal is extracted from the second plate 3 and fed to an amplifier 5.2. The output signal thereof is fed to an analog filter 5.3, which can be a low-pass filter, for example. The output signal thereof is finally fed to a 180° phase shifter 5.4, the output signal of which is in turn fed back to the sensor element, in which it is fed to the first plate 2.

Provision can be made for the voltage supply 5.1 and the amplifier 5.2 and optionally also the analog filter 5.3 and the phase shifter 5.4 to be contained in an application-specific circuit (ASIC).

Figure 4:
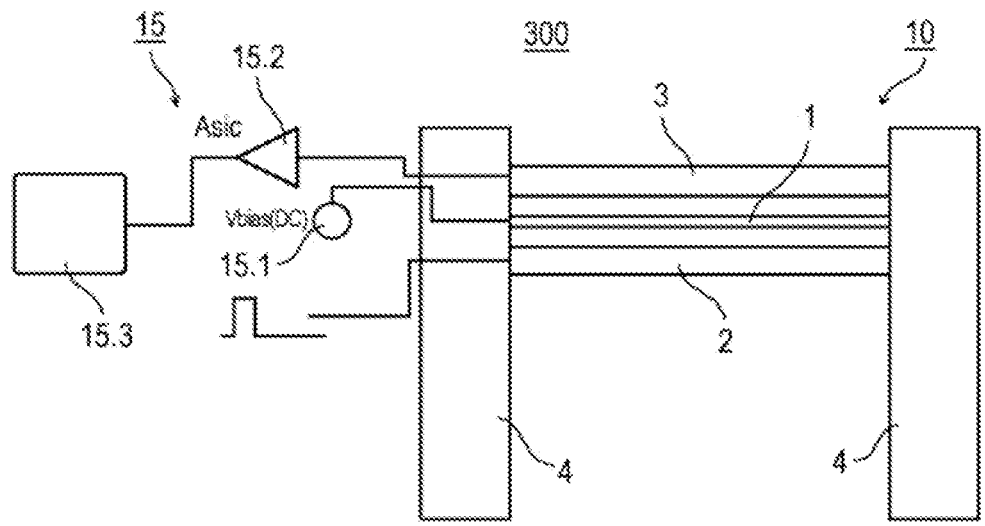
FIG. 4 shows a schematic lateral cross-sectional view of one example implementation of a gas sensor, in which the electronic circuit feeds an electrical signal in the form of a stepped or rectangular signal to the first plate and the output signal is fed to a fast Fourier transform unit.

FIG. 4 shows a schematic lateral cross-sectional view of one example implementation of a gas sensor, in which the electronic circuit feeds an electrical signal in the form of a stepped or rectangular signal to the first plate and the output signal is fed to a fast Fourier transform unit.

The gas sensor 300 in accordance with FIG. 4 has, in principle, the same construction as the gas sensor 100 in FIG. 1, and so the same reference signs have been used.

In specific detail, the electronic circuit 15 has a voltage supply 15.1, which is connected to the membrane 1 and using which a voltage in the range of 5 to 10 V is applied to the membrane 1. An electrical signal in the form of a stepped or rectangular signal generated by a pulse generator is fed to the first plate 2. The output signal is extracted from the second plate 3 and fed to an amplifier 15.2. The output signal thereof is fed to a fast Fourier transform (FFT) unit 15.3.

The electrical stepped or rectangular signal is emitted in the direction of the membrane 1 by the first plate 2 and excites the membrane to correspondingly emit ultrasonic radiation. The time profile of the rise and/or optionally fall of the signal is chosen such that it has a frequency spectrum comprising the resonance spectrum of the sensor element as shown in FIG. 3. The fast Fourier analysis yields the resonance curve shown in FIG. 3, from which the maximum can be determined at 37.2 kHz.

Provision can be made for the voltage supply 15.1 and the amplifier 15.2 and optionally also the FFT unit 15.3 and the pulse generator to be contained in an application-specific circuit (ASIC).

Figure 5:
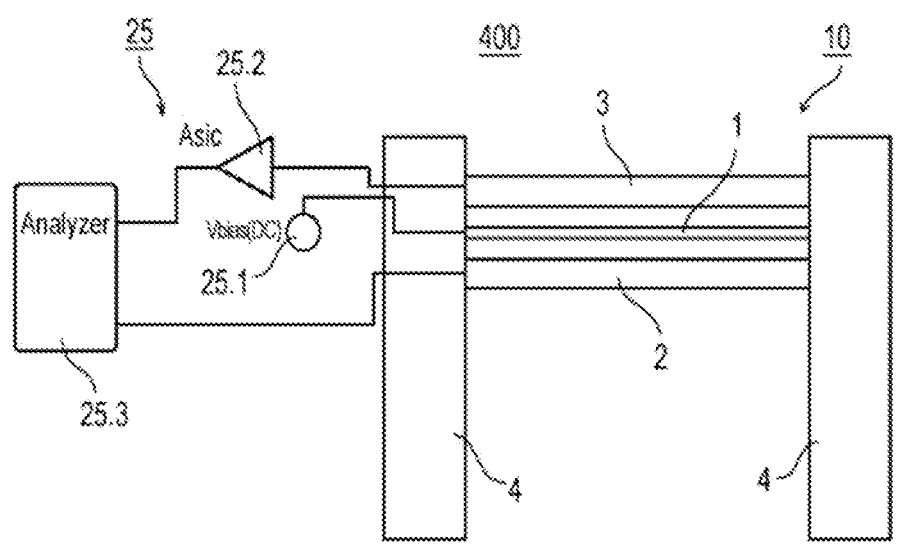
FIG. 5 shows a schematic lateral cross-sectional view of one example implementation of a gas sensor, in which the electronic circuit feeds an electrical signal having a frequency that changes over time to the first plate and the output signal is fed to an analyzer for determining the frequency with the maximum output signal.

FIG. 5 shows a schematic lateral cross-sectional view of one example implementation of a gas sensor, in which the electronic circuit feeds an electrical signal having a frequency that changes over time to the first plate and the output signal is fed to an analyzer for determining the frequency with the maximum output signal.

In specific detail, the electronic circuit 25 has a voltage supply 25.1, which is connected to the membrane 1 and using which a voltage in the range of 5 to 10 V is applied to the membrane 1. An electrical signal in the form of a frequency that changes over time is fed to the first plate 2 using an analyzer 25.3. The electrical signal that changes over time is emitted in the direction of the membrane 1 by the first plate 2 and excites the membrane to correspondingly emit ultrasonic radiation. The output signal is extracted from the second plate 3 and fed to an amplifier 25.2. The output signal thereof is in turn fed to the analyzer 25.3. The analyzer 25.3 yields the resonance curve shown in FIG. 3, from which the maximum can be determined at 37.2 kHz.

Provision can be made for the voltage supply 25.1 and the amplifier 25.2 and optionally also the analyzer 25.3 to be contained in an application-specific circuit (ASIC).

The gas sensor can furthermore have a temperature sensor and, connected to the temperature sensor, a compensation circuit configured to compensate for a temperature drift.

Furthermore, the gas sensor can have a barrier layer against dirt or water vapor, the barrier layer being arranged at the gas inlet opening of the gas sensor.

Prior to starting up the gas sensor for detecting hydrogen, the resonance curve in air under atmospheric conditions may be recorded and the resonance maximum may be determined therefrom. Afterward, the gas sensor may be calibrated by determining the respective shifts of the resonance maximum with different hydrogen concentrations being set.

Generally, a gas sensor of this type can be used for detecting various gases, but in particular hydrogen. The sensors can be fitted in or to any type of containers or lines in which gaseous hydrogen is stored or transported, in order in this way to carry out leak detection, for example. One important field of application is that of a fuel cell and for example at an inlet opening and/or an outlet opening of the fuel cell or in the passenger compartment of a motor vehicle operated with a fuel cell.

Aspects

Devices and methods in accordance with the disclosure are explained below based on aspects.

Aspect 1 is a gas sensor, comprising a membrane, a first plate arranged on a first side of the membrane and having through openings for the passage of a gas, a second plate arranged on a second side of the membrane, the second side being situated opposite the first side, and an electronic circuit, which is connected to the membrane, the first plate and the second plate and causes the membrane to emit ultrasonic radiation, and which is configured to determine a resonant frequency of the ultrasonic radiation.

Aspect 2 is a gas sensor according to aspect 1, wherein the electronic circuit has a voltage supply connected to the membrane.

Aspect 3 is a gas sensor according to aspect 2, wherein the electronic circuit feeds an electrical signal to the first plate and extracts an output signal from the second plate.

Aspect 4 is a gas sensor according to aspect 3, wherein the output signal is phase-shifted by 180° in the electronic circuit and the phase-shifted signal is fed to the first plate again.

Aspect 5 is a gas sensor according to aspect 4, wherein the output signal is fed to an analog filter in the electronic circuit before the phase shift of 180°.

Aspect 6 is a gas sensor according to aspect 3, wherein the electronic circuit feeds an electrical signal in the form of a stepped or rectangular signal to the first plate and the output signal is fed to a fast Fourier transform unit.

Aspect 7 is a gas sensor according to aspect 3, wherein the electronic circuit feeds an electrical signal having a frequency that changes over time to the first plate and the output signal is fed to an analyzer for determining the frequency with the maximum output signal.

Aspect 8 is a gas sensor according to any of the preceding aspects, furthermore comprising a temperature sensor and, connected to the temperature sensor, a compensation circuit configured to compensate for a temperature drift.

Aspect 9 is a gas sensor according to any of the preceding aspects, furthermore comprising a barrier layer against dirt or water vapor, the barrier layer being arranged at a gas inlet opening of the gas sensor.

Aspect 10 is a gas sensor according to any of the preceding aspects, wherein the electronic circuit is furthermore configured to determine the concentration of hydrogen from the resonant frequency determined.

Aspect 11 is a use of a gas sensor according to any of the preceding aspects for detecting hydrogen.

Aspect 12 is a use of a gas sensor according to aspect 11 in the case of a container or in the case of lines in which gaseous hydrogen is stored or transported.

Aspect 13 is a use of a gas sensor according to any of aspects 1 to 10 in the case of a fuel cell.

Aspect 14 is a use of a gas sensor according to aspect 13, wherein the gas sensor is fitted at an inlet opening and/or an outlet opening of the fuel cell.

Although specific implementations have been illustrated and described here, those of ordinary skill in the art will appreciate that a large number of alternative and/or equivalent implementations can replace the specific implementations shown and described, without the scope of the present disclosure being exceeded. This application is intended to cover all adaptations or variations of the specific implementations discussed here. Therefore, the intention is for this disclosure to be restricted only by the claims and the equivalents thereof.

What is claimed is:

1. A gas sensor, comprising:
   a membrane;
   a first plate arranged on a first side of the membrane and having through openings for a passage of a gas;
   a second plate arranged on a second side of the membrane, the second side being situated opposite the first side; and
   an electronic circuit, which is connected to the membrane, the first plate, and the second plate, wherein the electronic circuit causes the membrane to emit ultrasonic radiation, and wherein the electronic circuit is configured to determine a resonant frequency of the ultrasonic radiation, and
   wherein the electronic circuit is configured to provide an electrical signal to the first plate and extract an output signal from the second plate.

2. The gas sensor as claimed in claim 1, wherein the electronic circuit includes a voltage supply connected to the membrane.

3. The gas sensor as claimed in claim 1, wherein:
   the electronic circuit is configured to phase-shift the output signal by 180° to produce a phase-shifted signal, and wherein the electronic circuit is configured to provide the phase-shifted signal, as the electrical signal, to the first plate.

4. The gas sensor as claimed in claim 3, wherein:
   the electronic circuit is configured to provide the output signal to an analog filter in the electronic circuit before the output signal is phase-shifted by 180°.

5. The gas sensor as claimed in claim 1, wherein:
   the electrical signal comprises a stepped signal or a rectangular signal, and
   the electronic circuit is configured to provide the output signal to a fast Fourier transform unit.

6. The gas sensor as claimed in claim 1, wherein:
the electronic circuit is configured to provide the electrical signal such that the electrical signal has a frequency that changes over time, and provide the output signal to an analyzer for determining a frequency associated with a maximum output signal.

7. The gas sensor as claimed in claim 1, further comprising:
a temperature sensor and, connected to the temperature sensor, a compensation circuit configured to compensate for a temperature drift.

8. The gas sensor as claimed in claim 1, further comprising:
a barrier layer configured to provide a barrier against dirt or water vapor, the barrier layer being arranged at a gas inlet opening of the gas sensor.

9. The gas sensor as claimed in claim 1, wherein:
the electronic circuit is configured to determine a concentration of hydrogen based on the resonant frequency.

10. The gas sensor as claimed in claim 1, wherein:
the gas sensor is configured to detect hydrogen.

11. The gas sensor as claimed in claim 10, wherein:
the gas sensor is configured to be utilized with a container that is configured to store gaseous hydrogen or lines configured to transport the gaseous hydrogen.

12. The gas sensor as claimed in claim 1, wherein the gas sensor is configured to detect a gas associated with a fuel cell.

13. The gas sensor as claimed in claim 12, wherein:
the gas sensor is fitted at one or more of an inlet opening of the fuel cell or an outlet opening of the fuel cell.

14. The gas sensor as claimed in claim 1, wherein the electronic circuit is configured to generate the electrical signal based on the output signal.

15. The gas sensor as claimed in claim 1, wherein the electronic circuit includes a voltage supply connected to the membrane, and
wherein the electronic circuit includes a pulse generator configured to generate the electrical signal.

16. The gas sensor as claimed in claim 1, wherein:
the electronic circuit is configured to provide the electrical signal such that the electrical signal has a frequency that changes over time, and provide the output signal to an analyzer for determining a frequency at which the output signal has a maximum amplitude.

17. A gas sensor, comprising:
a membrane;
a first plate arranged on a first side of the membrane and having through openings for a passage of a gas;
a second plate arranged on a second side of the membrane, the second side being situated opposite the first side; and
an electronic circuit, which is connected to the membrane, the first plate, and the second plate,
wherein the electronic circuit causes the membrane to emit ultrasonic radiation,
wherein the electronic circuit is configured to determine a resonant frequency of the ultrasonic radiation, and
wherein the electronic circuit is configured to extract an output signal from the second plate, filter the output signal using an analog filter to produce a filtered signal, and provide an electrical signal corresponding to the filtered signal to the first plate.

18. The gas sensor as claimed in claim 17, wherein the electronic circuit is configured to phase-shift the filtered signal to produce a phase-shifted signal, and provide the phase-shifted signal, as the electrical signal, to the first plate.

19. The gas sensor as claimed in claim 18, wherein the electronic circuit includes a phase shifter configured to phase-shift the filtered signal by 180° to produce the phase-shifted signal.

20. The gas sensor as claimed in claim 17, wherein the electronic circuit includes an amplifier coupled to an input of the analog filter, the amplifier configured to amplify the output signal.

21. The gas sensor as claimed in claim 17, wherein the electrical signal is a stepped signal or a rectangular signal.

22. The gas sensor as claimed in claim 17, wherein the electronic circuit includes a control loop configured to generate the electrical signal based on the output signal.

23. The gas sensor as claimed in claim 17, wherein the electronic circuit includes a voltage supply connected to the membrane.

24. A gas sensor, comprising:
a membrane;
a first plate arranged on a first side of the membrane and having through openings for a passage of a gas;
a second plate arranged on a second side of the membrane, the second side being situated opposite the first side; and
an electronic circuit, which is connected to the membrane, the first plate, and the second plate,
wherein the electronic circuit causes the membrane to emit ultrasonic radiation,
wherein the electronic circuit is configured to determine a resonant frequency of the ultrasonic radiation, and
wherein the electronic circuit is configured to extract an output signal from the second plate, phase shift the output signal to produce a phase-shifted signal, and provide an electrical signal corresponding to the phase-shifted signal to the first plate.

\* \* \* \* \*